(12) United States Patent
Cho et al.

(10) Patent No.: US 11,788,339 B2
(45) Date of Patent: Oct. 17, 2023

(54) TWO-STAGE OPEN STRUCTURE OF VEHICLE DOOR

(71) Applicants: Hyundai Motor Company, Seoul (KR); Kia Corporation, Seoul (KR)

(72) Inventors: Ki Hyun Cho, Hwaseong-si (KR); Jae Yun Lee, Yangsan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 207 days.

(21) Appl. No.: 17/384,353

(22) Filed: Jul. 23, 2021

(65) Prior Publication Data

US 2022/0205301 A1 Jun. 30, 2022

(30) Foreign Application Priority Data

Dec. 31, 2020 (KR) .......................... 10-2020-0188622

(51) Int. Cl.
*E05F 15/611* (2015.01)
*B60J 5/04* (2006.01)
*B60J 5/06* (2006.01)

(52) U.S. Cl.
CPC ............ *E05F 15/611* (2015.01); *B60J 5/047* (2013.01); *B60J 5/06* (2013.01); *E05Y 2201/434* (2013.01); *E05Y 2900/516* (2013.01); *E05Y 2900/531* (2013.01)

(58) Field of Classification Search
CPC . B60J 5/045; B60J 5/047; B60J 5/0473; B60J 5/06; B60J 5/062; B60J 5/0498; B60J 5/103; B60J 5/104; E05Y 2900/531; E05Y 2201/434; E05F 15/611

USPC ................ 296/76, 78, 146.1, 146.11, 146.12
See application file for complete search history.

(56) References Cited

U.S. PATENT DOCUMENTS

| | | | | |
|---|---|---|---|---|
| 2,711,343 A * | 6/1955 | Falk | ........................ | B60J 5/0498 296/186.4 |
| 4,375,140 A * | 3/1983 | Blair | ..................... | E05F 17/004 49/108 |
| 4,413,854 A * | 11/1983 | Hirshberg | ............ | B62D 25/105 296/37.16 |
| 4,688,844 A * | 8/1987 | Hirose | ..................... | B60J 5/101 296/76 |
| 5,577,793 A * | 11/1996 | Kobasic | ................. | B62D 31/02 296/146.12 |
| 2013/0099524 A1 * | 4/2013 | Brown | .................. | E05F 15/605 296/146.9 |

FOREIGN PATENT DOCUMENTS

| | | | | |
|---|---|---|---|---|
| DE | 19901016 A1 * | 8/2000 | ............... | B60J 5/062 |
| DE | 102010051428 B4 * | 6/2012 | ............ | B60J 5/0498 |
| FR | 2876076 A1 * | 4/2006 | ............ | B60J 1/1884 |
| KR | 20090043127 A | 5/2009 | | |
| KR | 20090131326 A * | 12/2009 | | |
| WO | WO-2022182227 A1 * | 9/2022 | | |

* cited by examiner

*Primary Examiner* — Amy R Weisberg
*Assistant Examiner* — Kevin P Weldon
(74) *Attorney, Agent, or Firm* — Slater Matsil, LLP

(57) ABSTRACT

A two-stage open structure of a vehicle door includes a first-stage door configured to be rotated open with respect to a first hinge, a second-stage door configured to be rotated open together with the first-stage door with respect to a second hinge, a cross member, and a motor module positioned on the cross member and configured to apply a driving force to the first hinge and the second hinge individually.

20 Claims, 8 Drawing Sheets

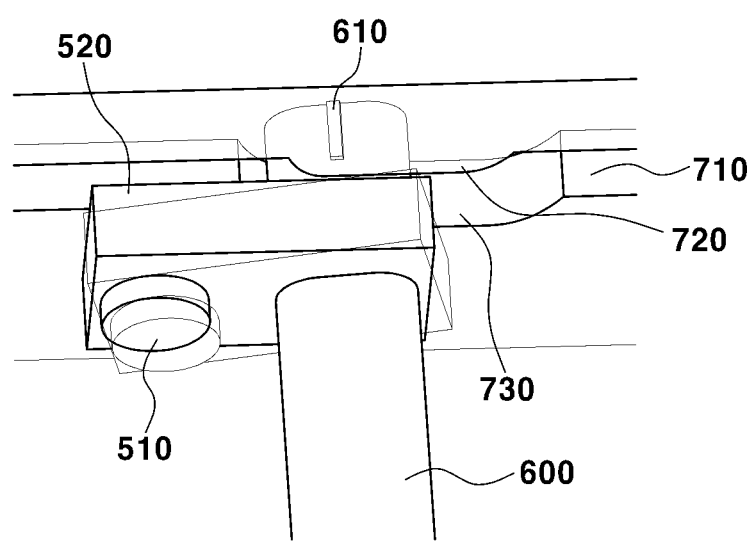

TWO-STAGE OPEN STRUCTURE OF VEHICLE DOOR

CROSS-REFERENCE TO RELATED APPLICATIONS

This application claims the benefit of Korean Patent Application No. 10-2020-0188622, filed on Dec. 31, 2020, which application is hereby incorporated herein by reference.

TECHNICAL FIELD

The present disclosure relates to a two-stage open structure of a vehicle door.

BACKGROUND

There are several types of doors for vehicles. Among the types of doors for vehicles, a swing type door that is mainly applied to a passenger car, a sliding type door that is mainly applied to a midsize van, and a hatchback type door that is mainly applied to a tail door of a van and Recreational Vehicle (RV) are exemplified.

On the other hand, a Purpose Built Vehicle (PBV), which extends living space, is emerging as a mobility of the future. For example, if PBVs respectively configured as a shoe shop and a clothing store are docked to a hub, the hub becomes a shopping center. Extensibility of a function and design according to the purpose of the PBV is substantially large. The PBV is a new type of mobility, which is not a private vehicle or a bus such as public transportation, and is used as a flexible space where the purpose of a hub is changed depending on the purpose of the PBV that is docked on the hub.

For more efficient use of the PBV, it is necessary to have a dualized open structure of a door in accordance with surroundings. When limited opening space is needed, such as when a passenger is exiting the PBV or when the ceiling height is low, the door needs to be partially opened. On the other hand, when bulky luggage is loaded, there is a need to increase an opening portion by fully opening the door.

A conventional upward-single opening and closing type tail door, which is an integral structure, has a problem in that the entire tail door is rotated at the same angle when the tail door is opened and closed. Moreover, when the door is opened, there is a problem in that a hinge portion is pushed or a hinge arm is drooped.

Korean Patent Application Publication No. 10-2009-0043127 describes information related to the present subject matter.

SUMMARY

The present disclosure relates to a two-stage open structure of a vehicle door. Particular embodiments relate to a two-stage open structure of a vehicle door, the two-stage open structure being configured to open and close a second-stage door of a vehicle by using an existing structure of a first-stage door.

Accordingly, embodiments of the present disclosure have been made keeping in mind problems occurring in the related art, and embodiments of the present disclosure provide a two-stage open structure of a vehicle door, the structure being configured to selectively open a first-stage door or a second-stage door by rotating a single motor module.

In addition, embodiments of the present disclosure provide a cross member configured to perform a sliding movement of the motor module so that the motor module is selectively fastened to a first hinge or to a second hinge.

Embodiments of the present disclosure are not limited to the aforementioned embodiments and other objectives and advantages of embodiments of the present disclosure, which are not mentioned, can be appreciated by the following description and will be made more apparent by the exemplary embodiments of the present disclosure. Further, the embodiments of the present disclosure may be implemented by means represented in the scope of the present disclosure and combinations thereof.

According to one embodiment of the present disclosure, there is provided a two-stage open structure of a vehicle door including a first-stage door configured to be rotated open with respect to a first hinge, a second-stage door configured to be rotated open together with the first-stage door with respect to a second hinge, a motor module configured to apply a driving force to the first hinge or the second hinge, a cross member on which the motor module is positioned, and a sliding unit configured such that the cross member is moved together with the motor module along the sliding unit, wherein the cross member is configured to be moved along the sliding unit so that the motor module is selectively fastened to the first hinge or the second hinge.

In addition, the sliding unit may further include a rail portion positioned on the vehicle body and configured such that at least a portion of the cross member is inserted into and moved along the rail portion and a guide portion positioned on the rail portion and configured to allow the cross member to be rotated.

In addition, a protrusion portion may be positioned on the cross member and may be configured to be in contact with the guide portion so that the cross member is rotationally moved along the rail portion.

In addition, the two-stage open structure may further include a fixation member positioned at at least one end of the cross member, the end being adjacent to the vehicle body, and the fixation member extending along a longitudinal direction of the cross member and inserted into the inside of the vehicle body.

In addition, the fixation member may be configured to be inserted into a first insertion groove which is formed on the vehicle body at a position corresponding to a position where the motor module is fastened to the first hinge.

In addition, the fixation member may be configured to be inserted into a second insertion groove which is formed on the vehicle body at a position corresponding to a position where the motor module is fastened to the second hinge.

In addition, the motor module may further include a fastening portion to which the first hinge or the second hinge is selectively fastened, a housing fixedly positioned on the cross member integrally with the fastening portion, and a drive unit positioned inside the housing and configured to apply the driving force to the fastening portion.

In addition, the cross member may be configured such that when the housing is moved along the sliding unit, the cross member is rotated to bring the fastening portion into contact with the first hinge or the second hinge.

In addition, the two-stage open structure may further include a first bracket positioned between the first hinge and the second-stage door.

In addition, the two-stage open structure may further include a fixation pin configured to fix the first hinge by penetrating through the first hinge and the first bracket.

In addition, at least two through holes may be formed in the first hinge to cooperate with the fixation pin when the first-stage door is in an opened state or a closed state.

In addition, the two-stage open structure may further include a second bracket positioned between the second hinge and the vehicle body.

Embodiments of the present disclosure may obtain the following effects based on the above embodiments and the configurations, combinations and relations that will be described later.

Embodiments of the present disclosure provide a structural simplification effect by the two-stage open structure of a vehicle door due to the provision of the motor module in the two-stage open structure.

In addition, embodiments of the present disclosure provide structural stability that is capable of fixing the opened state of the first-stage door such that the drooping situation of a door is prevented.

BRIEF DESCRIPTION OF THE DRAWINGS

The above and other objectives, features, and other advantages of embodiments of the present disclosure will be more clearly understood from the following detailed description when taken in conjunction with the accompanying drawings, in which:

FIG. 3B is a view illustrating the operation that the protrusion portion positioned on the upper end of the cross member is rotated in contact with a guide portion of the two-stage open structure of a vehicle door according to an embodiment of the present disclosure;

DETAILED DESCRIPTION OF ILLUSTRATIVE EMBODIMENTS

Hereinafter, embodiments of the present disclosure will be described more in detail with reference to the accompanying drawings. The embodiments of the present disclosure may be modified in various forms, and the scope of the present disclosure should not be construed as being limited to the following embodiments. The embodiments are provided to more fully explain the present disclosure to those skilled in the art.

In addition, the terms such as "portion", "unit", and "member" described in the specification indicate a unit for processing at least one function or operation, which may be implemented by hardware or a combination of hardware.

In addition, some of the components are called a first, a second, etc., throughout the detailed descriptions in an effort to distinguish such components from one another because they have the same configurations, but in the description below, such a sequence is not limiting.

In addition, the term "door" described in the specification includes both a door that opens in the front and rear directions of the vehicle, and a door that opens in both directions in the width direction of the vehicle. Embodiments of the present disclosure will be described with the door that opens in the width direction of the vehicle.

In addition, the term "closed state" described in the specification refers to a state in which both a first-stage door 100 and a second-stage door 300 are closed, the term "opened state of the first-stage door 100" refers to a state in which the first-stage door 100 is rotated open with respect to a cross member 600 and the second-stage door 300 is closed, and the term "opened state of the second-stage door 300" refers to a state in which the second-stage door 300 is opened together with the first-stage door 100 or the second-stage door 300 is opened when the first-stage door 100 is in the opened state or in the closed state.

In addition, in the specification, "upper end" refers to a direction moving to the top in the height direction according to a drawing.

Figure 1A:
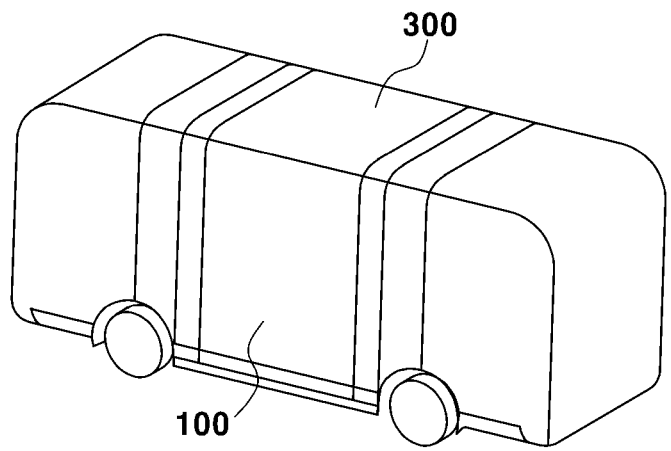
FIG. 1A is a perspective view illustrating a vehicle that includes a two-stage open structure of a vehicle door according to an embodiment of the present disclosure.

The present disclosure relates to a two-stage open structure of a vehicle door. FIG. 1A is a perspective view illustrating a vehicle that includes the two-stage open structure of a vehicle door according to an embodiment of the present disclosure, and FIG. 1B is a view illustrating a door-closed state of the two-stage open structure of a vehicle door according to an embodiment of the present disclosure.

The first-stage door 100 and the second-stage door 300 are configured to be positioned at at least one of both sides of a vehicle, and are configured to be rotated open to an upper end of the vehicle. More preferably, the first-stage door 100 is configured to be rotated open to the upper end direction with respect to a first end of the second-stage door 300, and the second-stage door is configured to be rotated open to the upper end direction with respect to a vehicle body frame which is positioned at the roof of the vehicle.

Figure 1B:
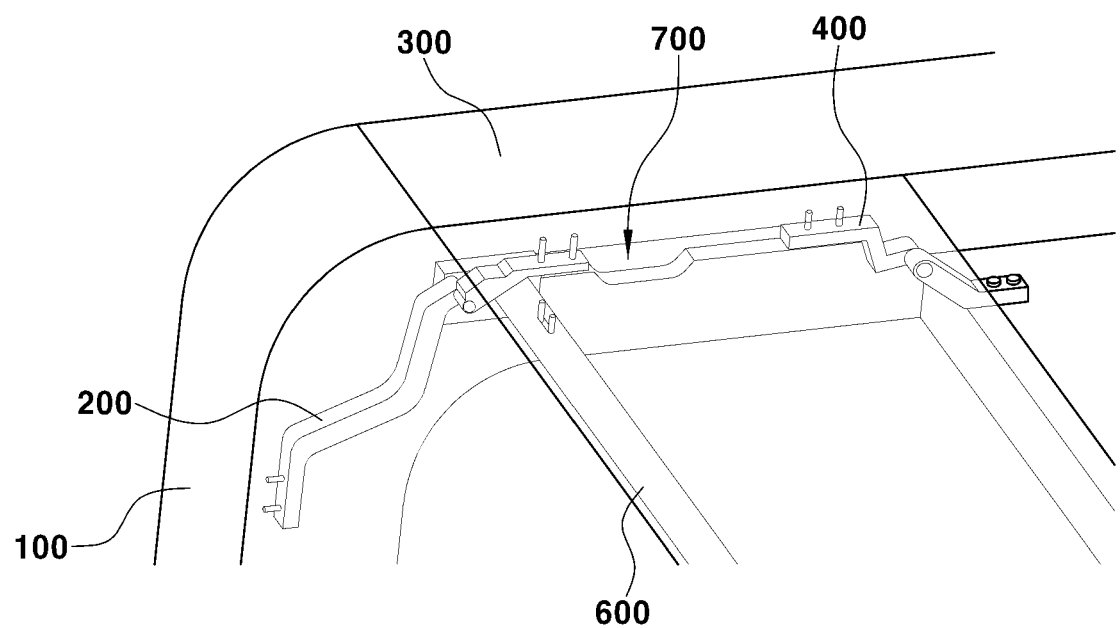
FIG. 1B is a view illustrating a door-closed state of the two-stage open structure of a vehicle door according to an embodiment of the present disclosure.

With reference to FIG. 1B, the first-stage door 100 and the second-stage door 300 of the two-stage open structure of a vehicle door according to an embodiment of the present disclosure may be configured to be opened as needed. The first-stage door 100 may be configured to be rotated open with respect to a first end of a first hinge 200. More preferably, the first end of the first hinge 200 is connected to a first bracket no which is fastened to the second-stage door 300, and is configured to be rotated around a point at which the first hinge 200 is fastened to the first bracket no. As such, the first-stage door 100 is rotated open to the upper end of the vehicle, and a height when the first-stage door 100 is fully opened is configured to be limited, so that the first-stage door 100 may be fully opened or closed even in a space where the ceiling height is low.

The first end of the first hinge 200 is fixed to the inside of the second-stage door 300 via the first bracket no, and the second end of the first hinge 200 is fastened to the inside of the first-stage door 100 such that the first-stage door 100 may be configured to be rotated open by transmitting an opening force to the first-stage door 100. The first hinge 200 may be formed in pairs on both side surfaces of the first-stage door 100.

The second-stage door 300 may be configured to be rotated open together with the first-stage door 100 with respect to a first end of a second hinge 400. More preferably, the second-stage door 300 may be rotated open together with the first-stage door 100 to the upper end of the vehicle such that all areas of a vehicle opening portion may be opened. Through this, securing a space may be facilitated for loading bulky luggage.

The first end of the second hinge 400 is fixed to the vehicle body frame, and the second end of the second hinge 400 is fastened to a first end inside the second-stage door 300 such that the second-stage door 300 may be configured to be rotated open by transmitting the opening force to the second-stage door 300. The second hinge 400 may be formed in pairs in a width direction of the vehicle body frame. More preferably, the second hinge 400 is fastened to the vehicle body via a second bracket 310, and is configured to be rotated open around a point at which the second hinge 400 is fastened to the second bracket 310, so that the second-stage door 300 may be rotated open together with the first-stage door 100.

The first hinge 200 may be configured to be positioned relatively outside the vehicle compared to the second hinge 400, and the second hinge 400 may be configured to be positioned relatively inside the vehicle. More preferably, for a vehicle having a gull-wing door, the first hinge 200 is configured to be positioned relatively outside the vehicle as compared to the second hinge 400.

The first-stage door 100 of embodiments of the present disclosure may be positioned in a height direction of the vehicle to be in contact with the side surface of the vehicle, and the second-stage door 300 may be configured to extend from the first end of the first-stage door 100 so that the second-stage door 100 may be configured to be positioned adjacent to the vehicle frame that extends in the width direction or the longitudinal direction of the vehicle and positioned at the center of the vehicle roof.

Figure 1C:
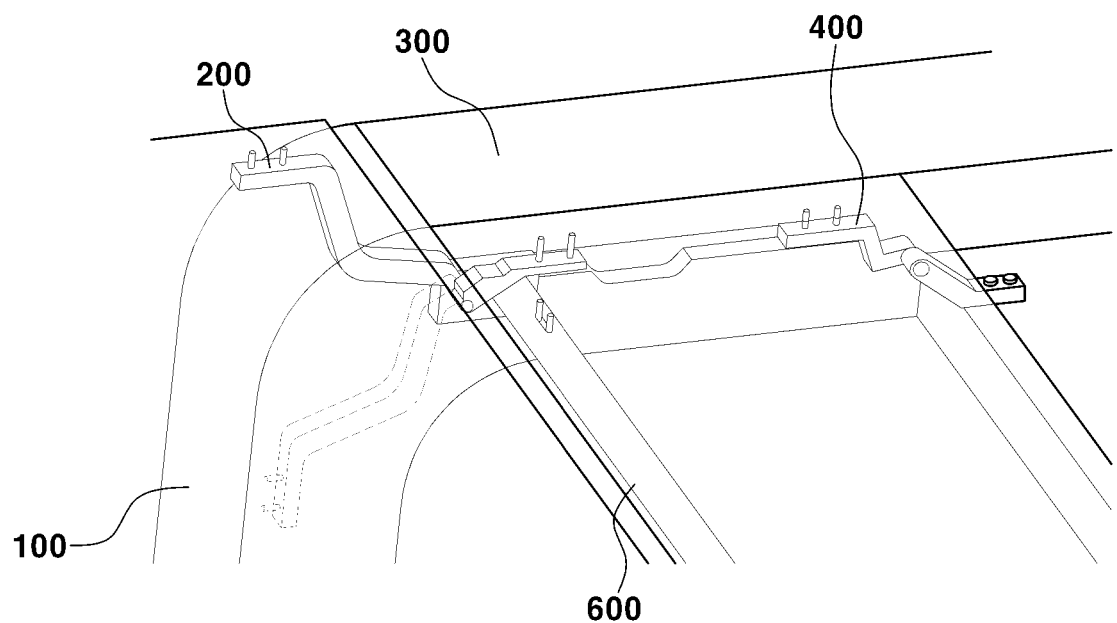
FIG. 1C is a view illustrating a first-stage door opened state of the two-stage open structure of a vehicle door according to an embodiment of the present disclosure.
Figure 1D:
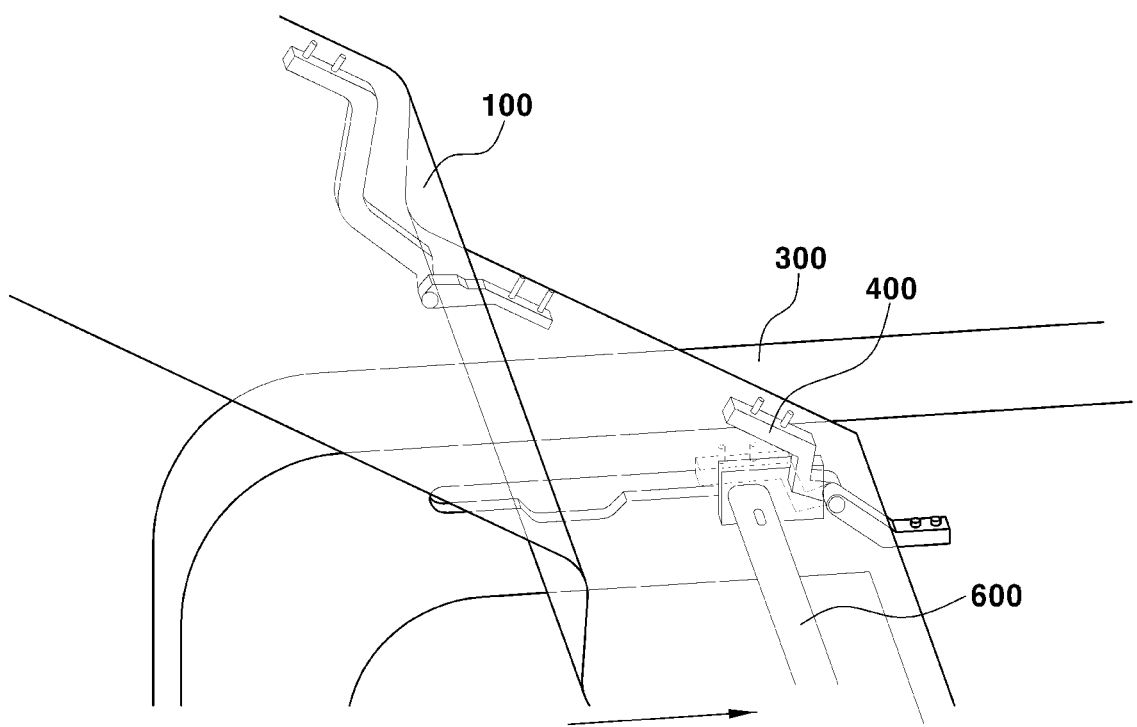
FIG. 1D is a view illustrating a second-stage door opened state of the two-stage open structure of a vehicle door according to an embodiment of the present disclosure.

FIG. 1C is a view illustrating a first-stage door opened state of the two-stage open structure of a vehicle door according to an embodiment of the present disclosure, and FIG. 1D is a view illustrating a second-stage door opened state of the two-stage open structure of a vehicle door according to an embodiment of the present disclosure.

With reference to FIGS. 1C and 1D, the two-stage open structure of a vehicle door according to an embodiment of the present disclosure may be configured to include a motor module 500 configured to apply a driving force to the first hinge 200 or the second hinge 400, a cross member 600 on which the motor module 500 is fastened, and a sliding unit 700 positioned at the vehicle body and configured such that at least a portion of the cross member 600 is inserted into and moved along the width direction of the vehicle.

The motor module 500 includes a fastening portion 510 configured to apply the driving force to the first hinge 200 or the second hinge 400. More preferably, the fastening portion 510 of the motor module 500 is fastened to the first hinge 200 when the first-stage door 100 is opened, and a rotating force applied from the motor module 500 is transmitted to the first hinge 200, such that the first hinge 200 to which the rotating force is applied is configured to rotationally open the first-stage door 100 with respect to the first end of the second-stage door 300.

In addition, the motor module 500 is configured to be moved together with the cross member 600 along the sliding unit 700, and the fastening portion 510 may be fastened to the second hinge 400 that is positioned at the second end of the second-stage door 300, so that the motor module 500 may apply the rotating force to the second hinge 400. The second hinge 400 to which the rotating force is applied is configured to rotationally open the second-stage door 300 together with the first-stage door 100 with respect to an end of the second bracket 310 which is fixed to the vehicle body.

The cross member 600 may be coupled with the motor module 500. The cross member 600 is configured to extend in the width direction of the door. More preferably, the cross member 600 may be positioned perpendicular to the longitudinal direction of the first-stage door 100 or the second-stage door 300. According to the drawings, the first-stage door 100 is positioned along the height direction of the vehicle, the second-stage door 300 is positioned along the width direction of the vehicle, and the cross member 600 is positioned along the longitudinal direction of the vehicle. In addition, in an embodiment of the present disclosure, the cross member 600 is configured to move along between a position where the first-stage door 100 and the second-stage door 300 are adjacent to a position where the second-stage door 300 and the vehicle body frame are adjacent. The cross member 600 is coupled with the motor module 500 so as to move along the sliding unit 700 together.

The sliding unit 700 is configured to be positioned on both sides of the vehicle body along the width direction of the second-stage door 300, and at least a portion of the cross member 600 is configured to be inserted inside the sliding unit 700.

The cross member 600 moving along the sliding unit 700 in the longitudinal direction of the sliding unit 700 may be selectively fastened to the first hinge 200 or the second hinge 400, and the motor module 500 positioned at the cross member 600 is configured such that a position of the motor module 500 is adjacent to the first hinge 200 and the second hinge 400. In addition, the cross member 600 includes a protrusion portion 610 configured to be in contact with a guide portion 720 that is positioned on a rail portion 710, such that the cross member 600 is configured to be rotated at a position where the protrusion portion 610 is in contact with the guide portion 720.

Therefore, when the cross member 600 is located in a first end of the sliding unit 700, a first end of the motor module 500 is fastened to the first hinge 200 so that the first-stage door 100 may be opened. When the cross member 600 moves to a second end of the rail portion 710 along the sliding unit 700 and is rotated, the first end of the motor module 500 is fastened to the second hinge 400 so that the second-stage door 300 may be opened.

Alternatively, the motor module 500 and the cross member 600 may be moved along the sliding unit 700 when the first-stage door 100 is closed, so that the motor module 500 may be fastened to the second hinge 400 and the second-stage door 300 may be opened. Through this, the second-stage door 300 may be opened by using the motor module 500 which provides the driving force for opening the first-stage door 100.

Figure 2:
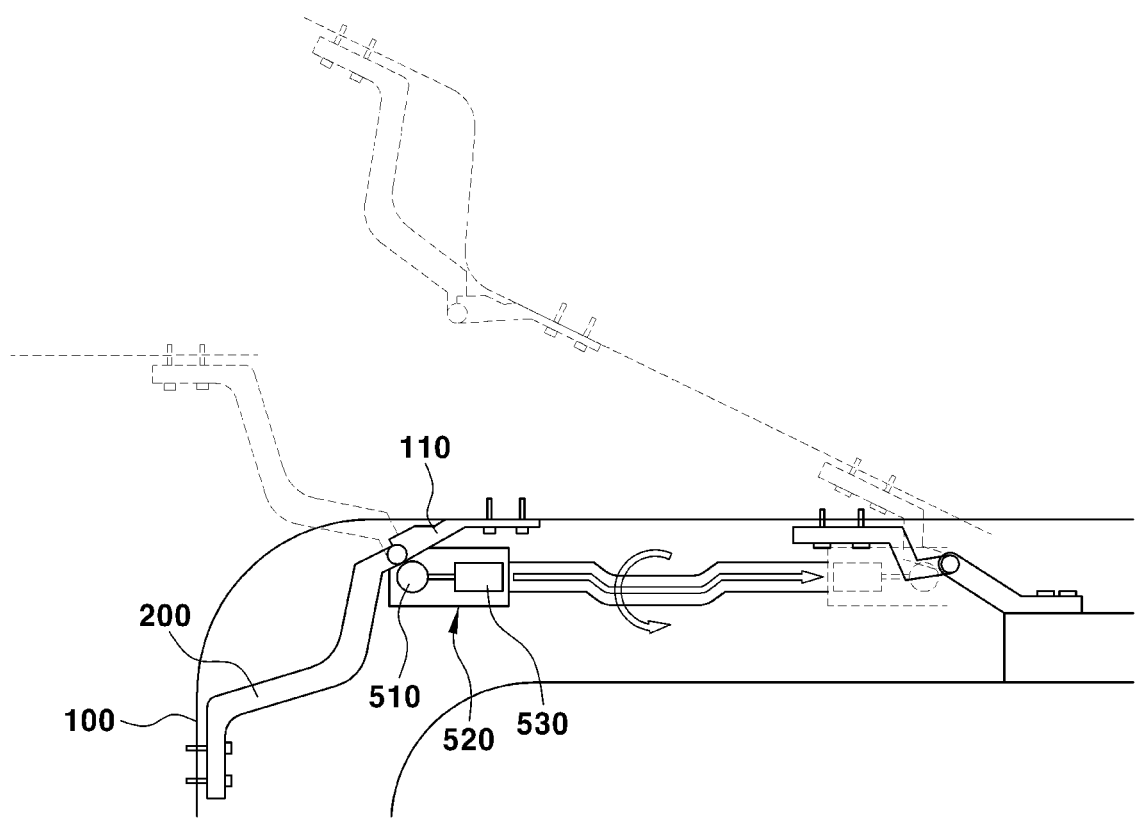
FIG. 2 is a cross-sectional side view illustrating the two-stage open structure of a vehicle door according to an embodiment of the present disclosure.
Figure 3A:
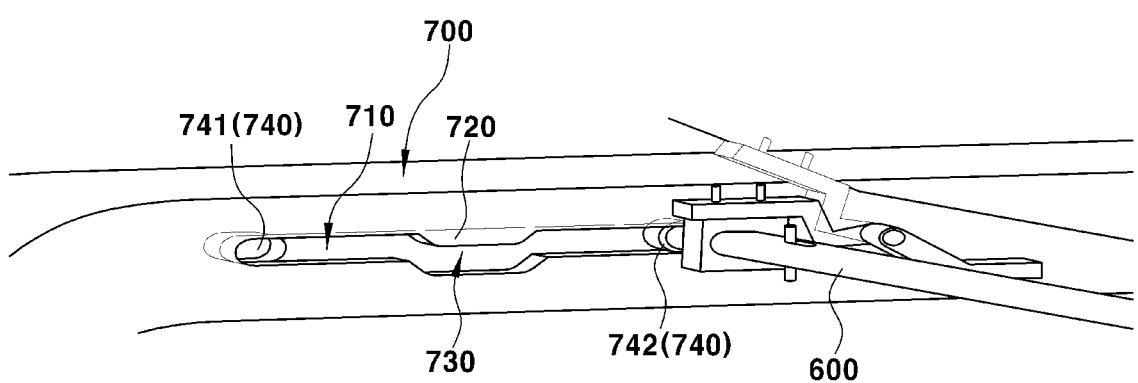
FIG. 3A is an enlarged view illustrating a rail portion which is positioned on the vehicle body and configured such that a cross member is moved of the two-stage open structure of a vehicle door according to an embodiment of the present disclosure.

FIG. 2 is a cross-sectional side view illustrating the two-stage open structure of a vehicle door according to an embodiment of the present disclosure, FIG. 3A is an enlarged view illustrating the rail portion 710 which is positioned on the vehicle body and configured such that the cross member 600 is moved, and FIG. 3B is a view illustrating the operation that the protrusion portion 610 positioned on the upper end of the cross member 600 is rotated in contact with the guide portion 720.

In embodiments of the present disclosure, the first-stage door 100 and the second-stage door 300 are positioned along the width direction of the vehicle, and include the second hinge 400 so that the second-stage door 300 is opened at the center portion of the width direction of the vehicle. In addition, in an embodiment of the present disclosure, the motor module 500 may be fastened to the first hinge 200 to which the first end of the first hinge 200 is positioned inside the first-stage door 100 and the second end of the first hinge 200 is fixed to the inside of the second-stage door 300 when the door is in the closed state. In another embodiment of the present disclosure, the motor module 500 may be fastened to the second hinge 400 when the door is in the closed state.

The motor module 500 is configured to open the first-stage door 100 or the second-stage door 300 when a door opening request is applied. More preferably, the motor module 500 is configured to be positioned to be fastened to the first end of the first hinge 200 in response to the first-stage door 100 opening request that is applied to a control unit, and the motor module 500 is configured to be positioned to be fastened to the first end of the second hinge 400 in response to the second-stage door 300 opening request that is applied to the control unit.

More preferably, the motor module 500 is moved along the sliding unit 700 which is positioned on both sides of the second-stage door 300 of the vehicle body, the sliding unit 700 is configured of the rail portion 710 positioned between the first hinge 200 and the second hinge 400, the cross member 600 positioned inside the rail portion 710 and moving together with the motor module 500, and the guide portion 720 positioned on the rail portion 710 so that the cross member 600 is rotated on the rail portion 710.

The motor module 500 includes the fastening portion 510 that is selectively fastened to the first hinge 200 and the second hinge 400, and a drive unit 530 that is providing the driving force to the fastening portion 510. Furthermore, a housing 520 is configured to surround the drive unit 530, and the fastening portion 510 is positioned outside the housing 520 such that the drive unit 530 positioned inside the housing 520 transmits the driving force to the fastening portion 510.

The cross member 600 is configured to be rotated by the guide portion 720 when the cross member 600 is moved along the rail portion 710 of the sliding unit 700, and the housing 520 of the motor module 500 is moved along the longitudinal direction of the rail portion 710 in response to a behavior of a user to open the second-stage door 300, so that a first end of the housing 520 contacting the first hinge 200 is rotated to contact the second hinge 400 by the guide portion 720. More preferably, the protrusion portion 610 is formed on the upper end of the cross member 600 and the guide portion 720 is formed at the center of the rail portion 710 where the protrusion portion 610 is adjacent, so that a second end of the cross member 600 is configured to be rotated with respect to a first end of the cross member 600. Furthermore, the lower end of the rail portion 710 adjacent to the guide portion 720 includes a groove portion 730 that is to provide a predetermined space for the cross member 600 to rotate.

In an embodiment of the present disclosure, the first end of the housing 520 that is in contact with the first hinge portion 200 or the second hinge portion 400 has the same configuration, so that the cross member 600 is configured to be rotated to 180 degrees during moving along the longitudinal direction of the rail portion 710. Therefore, the first end of the motor module 500 fixedly positioned at the cross member 600 is configured to be selectively in contact with the first hinge 200 and the second hinge 400.

The guide portion 720 is positioned on the rail portion 710, and is positioned on the upper surface of the rail portion 710 that is corresponding to the groove portion 730. Therefore, the lower end of the cross member 600 is configured to be rotated with respect to the upper end of the cross member 600 or the protrusion portion 610 by bringing the upper end of the protrusion portion 610 of the cross member 600 into contact with the guide portion 720, and a distal end of the cross member 600 is configured to be moved along inside the groove portion 730.

That is, the rail portion 710 includes the guide portion 720 which is configured such that the protrusion portion 610 positioned on the upper end of the cross member 600 is in contact with the guide portion 720 when the cross member 600 moves together with the motor module 500, and the housing 520 is positioned to be arranged in a direction where the fastening portion 510 is in contact with the second hinge 400 by rotating the cross member 600 with respect to the protrusion portion 610 when the protrusion portion is in contact with the guide portion 720.

As such, the fastening portion 510 positioned at the first end of the housing 520 is positioned to be in contact with the second hinge 400 after the motor module 500 is fastened to the first hinge 200 and the motor module 500 is rotated together with the cross member 600.

That is, the fastening portion 510 is configured to be selectively fastened to the first hinge 200 or the second hinge 400 by rotation of the motor module 500 that includes a fastening portion 510 which is connected to the drive unit 530.

Figure 4:
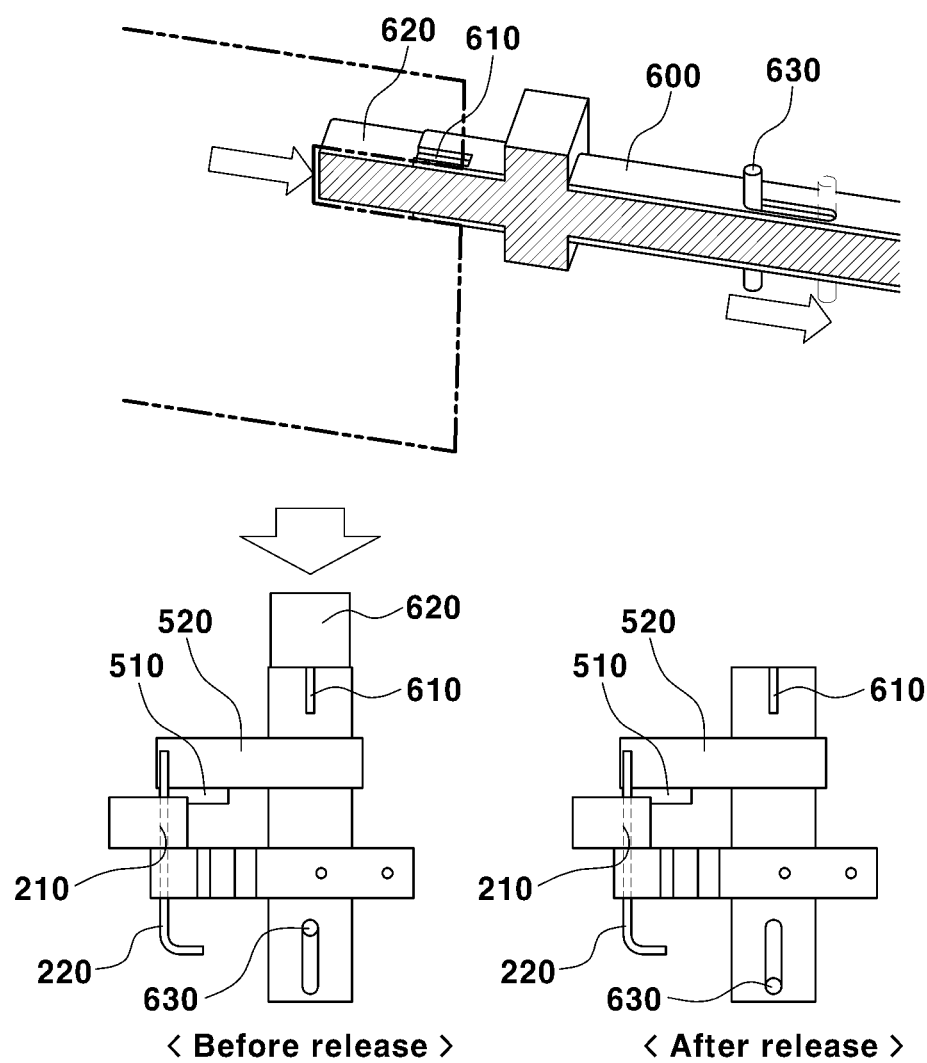
FIG. 4 is a structural view illustrating a fixation member of the two-stage open structure of a vehicle door according to an embodiment of the present disclosure.

In FIG. 4, at least one fixation member 620 which is positioned between opposite sides of the cross member 600 is illustrated.

At least a portion of the fixation member 620 is inserted into the distal end of the cross member 600, and an extension lobe 630 is included on at least one surface of the cross member 600 to extend the cross member 600 in the longitudinal direction of the cross member 600. More preferably, the fixation member 620 is positioned to be in contact with an inner circumferential surface of the cross member 600, and is configured to be moved along the longitudinal direction of the cross member 600.

Furthermore, the fixation member 620 may be selectively inserted into and fixed to an insertion groove 740 which is positioned inside of the rail portion 710 where both sides of the cross member 600 face. The insertion groove 740 positioned at the inside surface of the rail portion 710 includes a first insertion groove 741 formed at a position where the first hinge 200 and the fastening portion 510 contact, and a second insertion groove 742 formed at a position where the second hinge 400 and the fastening portion 510 contact.

The fixation member 620 may be fixed by being inserted into the inside of the insertion groove 740 via manually operating the extension lobe 630 by a user. Alternatively, an actuator or a motor that is fixed to the cross member 600 and fastened to the distal end of the fixation member 620 to apply the driving force may be included, so that the fixation member 620 may automatically extend outwardly in the longitudinal direction of the cross member 600 and is inserted into and fixed to the inside of the insertion groove 740.

When the fixation member 620 is released from the insertion groove 740, the cross member 600 may be freely moved along the rail portion 710 in the longitudinal direction of the rail portion 710. More preferably, the cross member 600 of embodiments of the present disclosure is configured to be moved along the rail portion 710 in response to manual input of the user.

Figure 5:
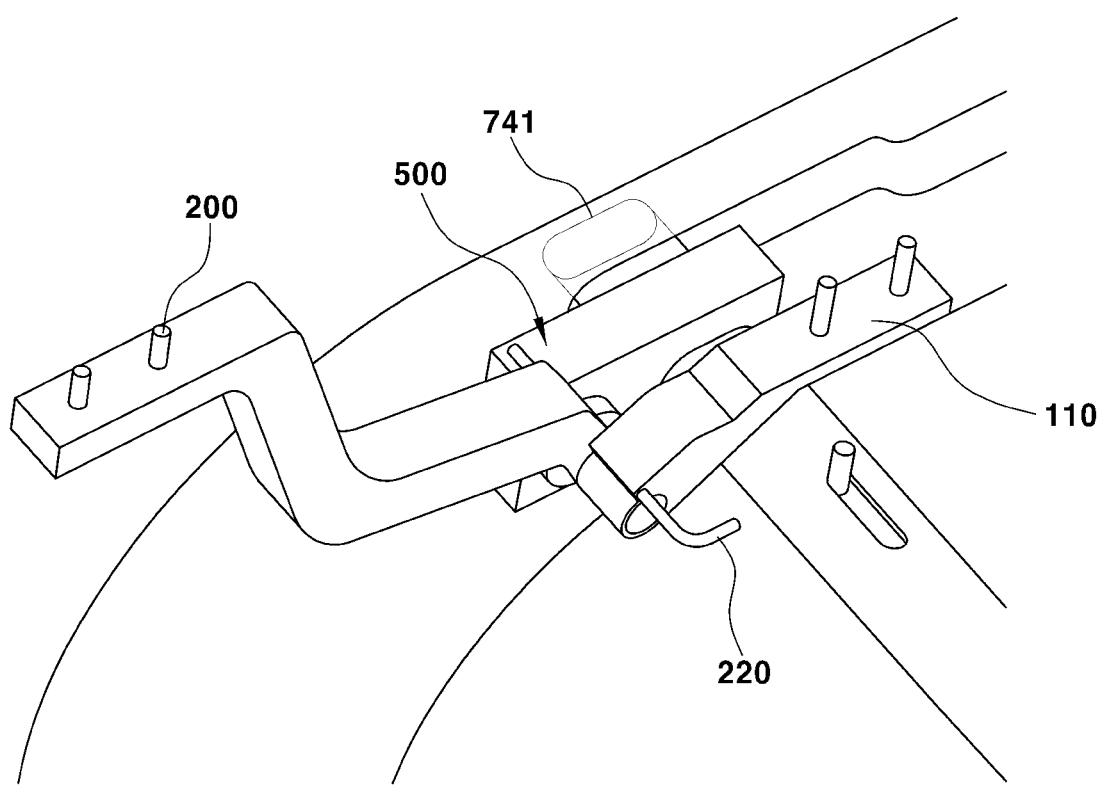
FIG. 5 is a view illustrating a fastening structure between the first-stage door and a motor module of the two-stage open structure of a vehicle door according to an embodiment of the present disclosure.

In FIG. 5, a fastening structure of the first-stage door 100 which includes a fixation pin 220 that is configured to fix the first hinge 200 is illustrated.

As illustrated in the drawings, the first hinge 200 is fastened to the second-stage door 300 via the first bracket 110, so that the first hinge 200 includes the fixation pin 220 which limits the rotation of the first hinge 200 by penetrating through the first bracket 110 and the first hinge 200.

The fixation pin 220 is simultaneously inserted through a through hole 210 that is positioned in the first hinge 200 and a fixation hole that is positioned in the first bracket no, such that at least two through holes 210 may be formed to the first hinge 200 to cooperate with the fixation pin 220 when the first-stage door 100 is in the opened state or the closed state.

That is, the fixation pin 220 is inserted into the through hole 210 and the fixation hole so as to fix the first hinge 200 and the first bracket no together, so that the fixation pin 220 is configured to maintain the opened state or the closed state of the first-stage door 100. In addition, the first-stage door 100 may be fixed to provide a safety of the first-stage door 100 even when the second-stage door 300 is opened.

Figure 6:
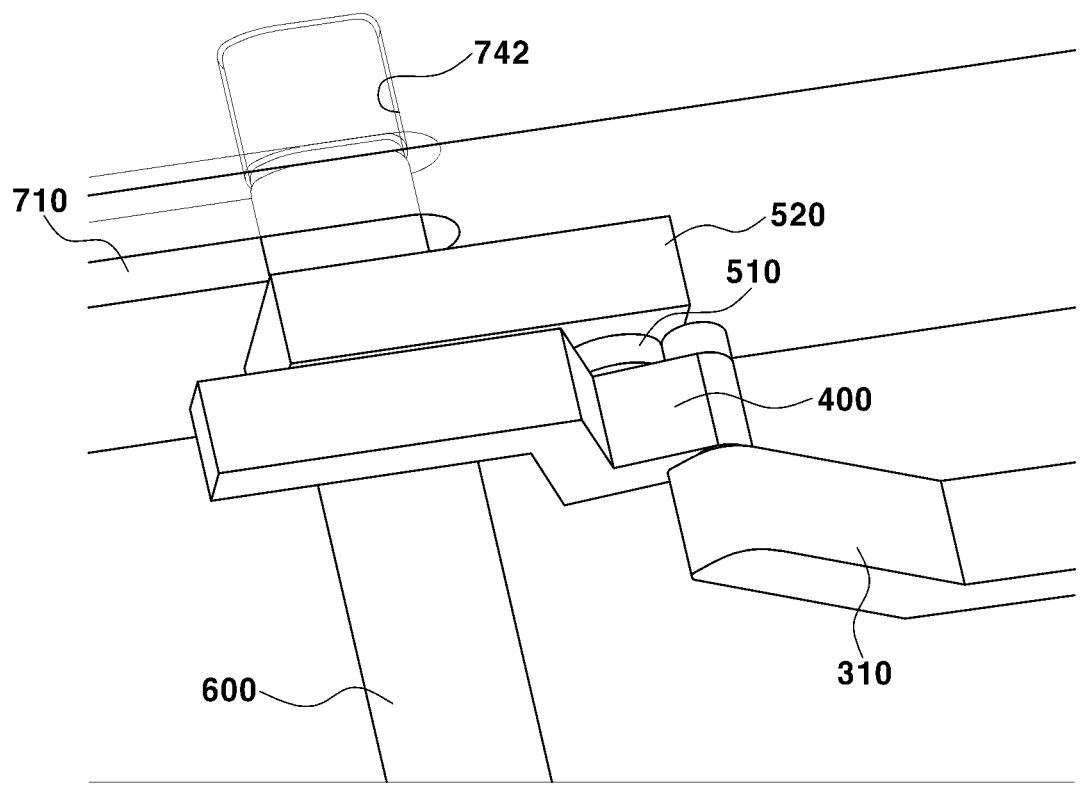
FIG. 6 is a view illustrating a fastening structure between the second-stage door and the motor module of the two-stage open structure of a vehicle door according to an embodiment of the present disclosure.

In FIG. 6, a fastening structure in which the fastening portion 510 is fastened to the second hinge 400 in order to open the second-stage door 300 is illustrated.

The second hinge 400 is fixed to the vehicle frame via the second bracket 310, and at least a portion of the second hinge 400 is configured to be in contact with the fastening portion 510 of the motor module 500. More preferably, in an embodiment of the present disclosure, the housing 520 of the motor module 500 may be moved to a position adjacent to the side surface of the second hinge 400, and the fastening portion 510 may be positioned at the first end of the moved housing 520 so as to be fastened to the second hinge 400.

The fastening portion 510 is gear-connected to the second hinge 400 and is configured to transmit a rotating force applied from the drive unit 530 to the second hinge 400. Therefore, the fastening portion 510 may be rotated and the first end of the second hinge 400 gear-connected to the fastening portion 510 may be rotated up and down in the height direction of the vehicle, such that the opening and closing of the second-stage door 300 may be configured to be controlled.

The fixation member 620 positioned at at least one distal end of the cross member 600 is configured to be inserted to the second insertion groove 742 formed inside the rail portion 710 where the fastening portion 510 is fastened to the second hinge 400 of the second-stage door 300, so as to fix the cross member 600 and the motor module 500 together.

Accordingly, in embodiments of the present disclosure, the motor module 500 including the drive unit 530 slides together with the cross member 600 along the rail portion 710, and is rotated on the rail portion 710 together with the cross member 600, so that the fastening portion 510 is selectively fastened to the first hinge 200 and the second hinge 400.

Figure 7:
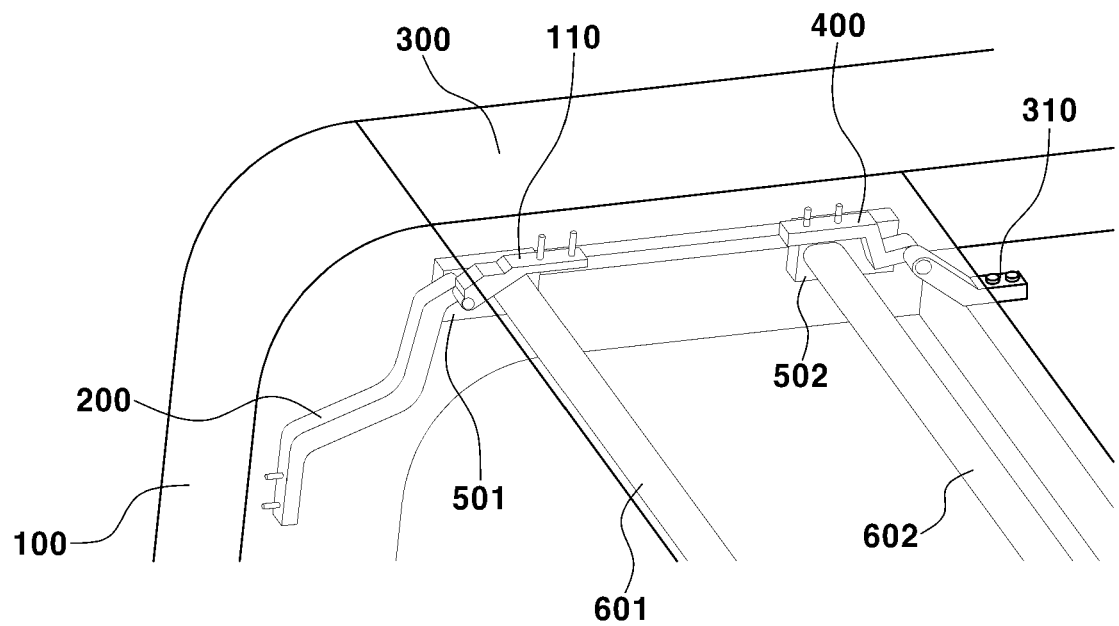
FIG. 7 is a perspective view illustrating the two-stage open structure of a vehicle door according to another embodiment of the present disclosure.
Figure 8:
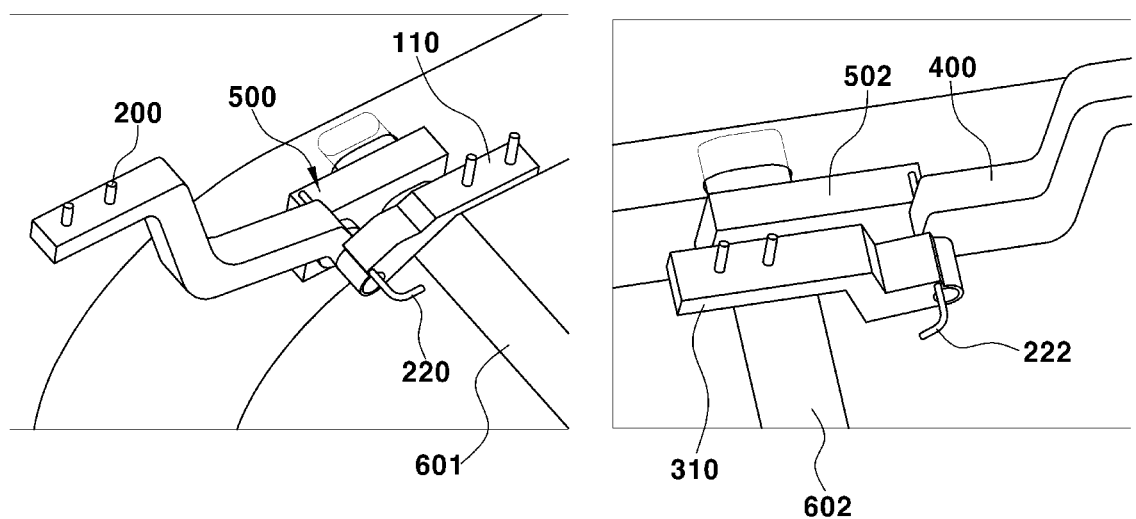
FIG. 8 is a view illustrating a fastening structure of the two-stage open structure of a vehicle door according to another embodiment of the present disclosure.

FIGS. 7 and 8 are views illustrating another embodiment of the present disclosure. In FIGS. 7 and 8, the first hinge 200 fastened with the first-stage door 100, a first motor module 501 connected to and fixed to the first hinge 200, a first cross member 601 at which the first motor module 501 is positioned and configured in the width direction of the first-stage door 100 so as to be fixed to both side surfaces of the vehicle body that is adjacent to the first-stage door 100 are included. In addition, the second hinge 400 fastened to the second-stage door 300, a second motor module 502 connected to the second hinge 400, and a second cross member 602 at which the second motor module 502 is positioned and configured in the width direction of the second-stage door 300 so as to be fixed to both sides of the vehicle body of the second-stage door 300 are included.

That is, the first motor module 501 fastened to the first hinge 200 of the first-stage door 100 and the second motor module 502 fastened to the second hinge 400 of the second-stage door 300 are independently configured.

Furthermore, the configuration of the motor modules 501, 502 and the hinges 200, 400 may have same configuration as the embodiment of the present disclosure described in FIGS. 1A to 6.

The first cross member 601 is configured to maintain the opening and closing state of the first-stage door 100 by including a first fixation pin 221 that is configured to fix the first hinge 200. In addition, the second cross member 602 is configured to maintain the opening and closing state of the second-stage door 300 by including a second fixation pin 222 that is configured to fix the second hinge 400.

The first hinge 200 is fastened to the second-stage door 300 via the first bracket no of which the first end thereof is fixed to the second-stage door 300, so that the first hinge 200 includes the first fixation pin 221 which limits the rotation of the first hinge 200 by penetrating through the first bracket no and the first hinge 200. In addition, the second hinge 400 is fastened by the second bracket 310 of which the first end thereof is fixed to the vehicle body, so that the second hinge 400 includes the second fixation pin 222 which limits the rotation of the second hinge 400 by penetrating through the second bracket 310 and the second hinge 400.

The fixation pins 221, 222 are inserted through the through holes 210 positioned in each of the hinges 200, 400 and the through hole 210 positioned in each of the brackets no, 110, 310 respectively, such that at least two through holes 210 may be formed in each of the hinges 200, 400 to cooperate with the fixation pin when each of the doors 100, 300 is in the opened state or the closed state.

In other words, the first fixation pin 221 is simultaneously inserted into the through hole 210 and the fixation hole so as to fix the first hinge 200 and the first bracket no together, and the second fixation pin 222 is simultaneously inserted into the through hole 210 and the fixation hole so as to fix the second hinge 400 and the second bracket 310 together. This allows the first-stage door 100 and the second-stage door 300 to maintain opened or closed states.

The fastening configuration fastened by each of the fixation pins 221, 222 may have the same configuration of an embodiment of the present disclosure described in FIGS. 1A to 6.

The above-described detailed descriptions are only examples of the present disclosure. In addition, the above-described descriptions have described exemplary embodiments of the present disclosure, and the present disclosure may be used in various other combinations, modifications, and environment. That is, the present disclosure may be changed and modified in a range of the concept and in an equivalent range of the content of the disclosure disclosed in the present specification and/or in technology or knowledge in the art. The described embodiments describe the best state for implementing the concept of the present disclosure, and various modifications required for applying the present disclosure to specific fields and uses may be possible. Accordingly, the above-described detailed description of the present disclosure does not limit the present disclosure to the embodiments disclosed. In addition, the appended claims should be interpreted to include other embodiments.

What is claimed is:

1. A two-stage open structure of a vehicle door, the two-stage open structure comprising:
    a first-stage door configured to be rotated open with respect to a first hinge;
    a second-stage door configured to be rotated open together with the first-stage door with respect to a second hinge;
    a cross member;
    a motor module positioned on the cross member and configured to apply a driving force to the first hinge and the second hinge individually; and
    a sliding unit configured such that the cross member is configured to be moved together with the motor module along the sliding unit, wherein the cross member is configured to be moved along the sliding unit so that the motor module is selectively fastened to the first hinge or the second hinge.

2. The two-stage open structure of claim 1, wherein the sliding unit further comprises:
    a rail portion positioned on a vehicle body, wherein at least a portion of the cross member is inserted into and configured to be moved along the rail portion; and
    a guide portion positioned on the rail portion and configured to allow the cross member to be rotated.

3. The two-stage open structure of claim 2, further comprising a protrusion portion positioned on the cross member and in contact with the guide portion so that the cross member is configured to rotationally move along the rail portion.

4. The two-stage open structure of claim 1, further comprising a fixation member positioned at an end of the cross member, the end being adjacent to a vehicle body, and the fixation member extending along a longitudinal direction of the cross member and inserted into an inside of the vehicle body.

5. The two-stage open structure of claim 4, wherein the fixation member is configured to be inserted into a first insertion groove formed on the vehicle body at a position corresponding to a position where the motor module is fastened to the first hinge.

6. The two-stage open structure of claim 4, wherein the fixation member is configured to be inserted into a second insertion groove formed on the vehicle body at a position corresponding to a position where the motor module is fastened to the second hinge.

7. The two-stage open structure of claim 1, wherein the motor module further comprises:
    a fastening portion to which the first hinge or the second hinge is selectively fastened;
    a housing fixedly positioned on the cross member integrally with the fastening portion; and
    a drive unit positioned inside the housing and configured to apply the driving force to the fastening portion.

8. The two-stage open structure of claim 7, wherein the cross member is configured such that when the housing is moved along the sliding unit, the cross member is rotated to bring the fastening portion into contact with the first hinge or the second hinge.

9. The two-stage open structure of claim 1, further comprising a bracket positioned between the second hinge and a vehicle body.

10. A two-stage open structure of a vehicle door, the two-stage open structure comprising:
    a first-stage door configured to be rotated open with respect to a first hinge;
    a second-stage door configured to be rotated open together with the first-stage door with respect to a second hinge;
    a cross member;
    a motor module positioned on the cross member and configured to apply a driving force to the first hinge and the second hinge individually;
    a first bracket positioned between the first hinge and the second-stage door; and
    a fixation pin configured to fix the first hinge by penetrating through the first hinge and the first bracket.

11. The two-stage open structure of claim 10, wherein at least two through holes are formed in the first hinge to cooperate with the fixation pin when the first-stage door is in an opened state or a closed state.

12. The two-stage open structure of claim 10, further comprising a second bracket positioned between the second hinge and a vehicle body.

13. A vehicle comprising:
    a vehicle body;
    a first-stage door coupled to the vehicle body and configured to be rotated open at a first hinge;
    a second-stage door coupled to the vehicle body and configured to be rotated open together with the first-stage door at a second hinge;
    a cross member;
    a motor module positioned on the cross member and configured to apply a driving force to the first hinge and the second hinge individually; and
    a sliding unit configured such that the cross member is configured to be moved together with the motor module along the sliding unit, wherein the cross member is configured to be moved along the sliding unit so that the motor module is selectively fastened to the first hinge or the second hinge.

14. The vehicle of claim 13, wherein the sliding unit further comprises:
    a rail portion positioned on the vehicle body, wherein at least a portion of the cross member is inserted into and configured to be moved along the rail portion; and
    a guide portion positioned on the rail portion and configured to allow the cross member to be rotated.

15. The vehicle of claim 14, further comprising a protrusion portion positioned on the cross member and in contact with the guide portion so that the cross member is configured to rotationally move along the rail portion.

16. The vehicle of claim 13, further comprising a fixation member positioned at an end of the cross member, the end being adjacent to the vehicle body, and the fixation member extending along a longitudinal direction of the cross member and inserted into an inside of the vehicle body.

17. The vehicle of claim 13, wherein the motor module further comprises:
- a fastening portion to which the first hinge or the second hinge is selectively fastened;
- a housing fixedly positioned on the cross member integrally with the fastening portion; and
- a drive unit positioned inside the housing and configured to apply the driving force to the fastening portion.

18. The vehicle of claim 17, wherein the cross member is configured such that when the housing is moved along the sliding unit, the cross member is rotated to bring the fastening portion into contact with the first hinge or the second hinge.

19. The vehicle of claim 16, wherein the fixation member is configured to be inserted into a first insertion groove formed on the vehicle body at a position corresponding to a position where the motor module is fastened to the first hinge.

20. The vehicle of claim 16, wherein the fixation member is configured to be inserted into a second insertion groove formed on the vehicle body at a position corresponding to a position where the motor module is fastened to the second hinge.

* * * * *